(12) United States Patent
Chen et al.

(10) Patent No.: US 11,748,188 B2
(45) Date of Patent: Sep. 5, 2023

(54) SECURE COMMUNICATION APPARATUS AND METHOD

(71) Applicant: Morningcore Technology Co., Ltd, Shanghai (CN)

(72) Inventors: ShanZhi Chen, Shanghai (CN); GuoBin Su, Shanghai (CN); SiYuan Xu, Shanghai (CN)

(73) Assignee: Morningcore Technology Co., Ltd, Pudong New Area (CN)

( * ) Notice: Subject to any disclaimer, the term of this patent is extended or adjusted under 35 U.S.C. 154(b) by 23 days.

(21) Appl. No.: 17/482,432

(22) Filed: Sep. 23, 2021

(65) Prior Publication Data

US 2022/0012114 A1 Jan. 13, 2022

Related U.S. Application Data

(63) Continuation of application No. PCT/CN2019/092774, filed on Jun. 25, 2019.

(30) Foreign Application Priority Data

Apr. 2, 2019 (CN) .......................... 201910261422.7

(51) Int. Cl.
*G06F 11/07* (2006.01)
*H04L 9/40* (2022.01)

(52) U.S. Cl.
CPC ........ *G06F 11/079* (2013.01); *G06F 11/0709* (2013.01); *H04L 63/20* (2013.01)

(58) Field of Classification Search
CPC . G06F 11/079; G06F 11/0709; G06F 11/2046
See application file for complete search history.

(56) References Cited

U.S. PATENT DOCUMENTS

| | | | |
|---|---|---|---|
| 2007/0288137 A1* | 12/2007 | Wanner | H04L 41/0681 701/1 |
| 2010/0076728 A1* | 3/2010 | Yanao | G05B 23/0237 700/297 |
| 2012/0252441 A1* | 10/2012 | Fujimoto | H04M 1/24 455/425 |
| 2013/0288609 A1* | 10/2013 | Mochizuki | H04B 17/17 455/67.11 |
| 2015/0088463 A1* | 3/2015 | Li | A61B 5/746 702/189 |
| 2018/0034912 A1 | 2/2018 | Binder et al. | |

FOREIGN PATENT DOCUMENTS

| | | |
|---|---|---|
| CN | 107526677 A | 12/2017 |
| CN | 104614663 B | 1/2018 |
| CN | 109150648 A | 1/2019 |

OTHER PUBLICATIONS

PCT/CN2019/092774 1st Search Report dated Jan. 2, 2020.

* cited by examiner

*Primary Examiner* — Jigar P Patel (57) ABSTRACT

A method for diagnosing secure communication. Before performing a data transmission, a self-diagnosing mode is entered. Error checkpoints are checked to generate a diagnostic status. The diagnostic status is collected. An error handling mode is entered to determine whether an error exists in the diagnostic status. When there is an error, the error is shielded. The method for diagnosing secure communication solves the problem of image burn-in, and further reduces the use of non-volatile memory. Therefore, the size and function utility of the integrated circuit can be further reduced.

8 Claims, 5 Drawing Sheets

SECURE COMMUNICATION APPARATUS AND METHOD

CROSS REFERENCE TO RELATED APPLICATION

This application is a continuation of International Application No. PCT/CN2019/092774 filed Jun. 25, 2019, claiming the priority benefit of Chinese Patent Application Serial Number 201910261422.7, filed on Apr. 2, 2019, the full disclosure of which is incorporated herein by reference.

BACKGROUND

Technical Field

The present application relates to the field of communications, and more particularly to devices and methods for secure communication for in-vehicle communications.

Related Art

Figure 1:
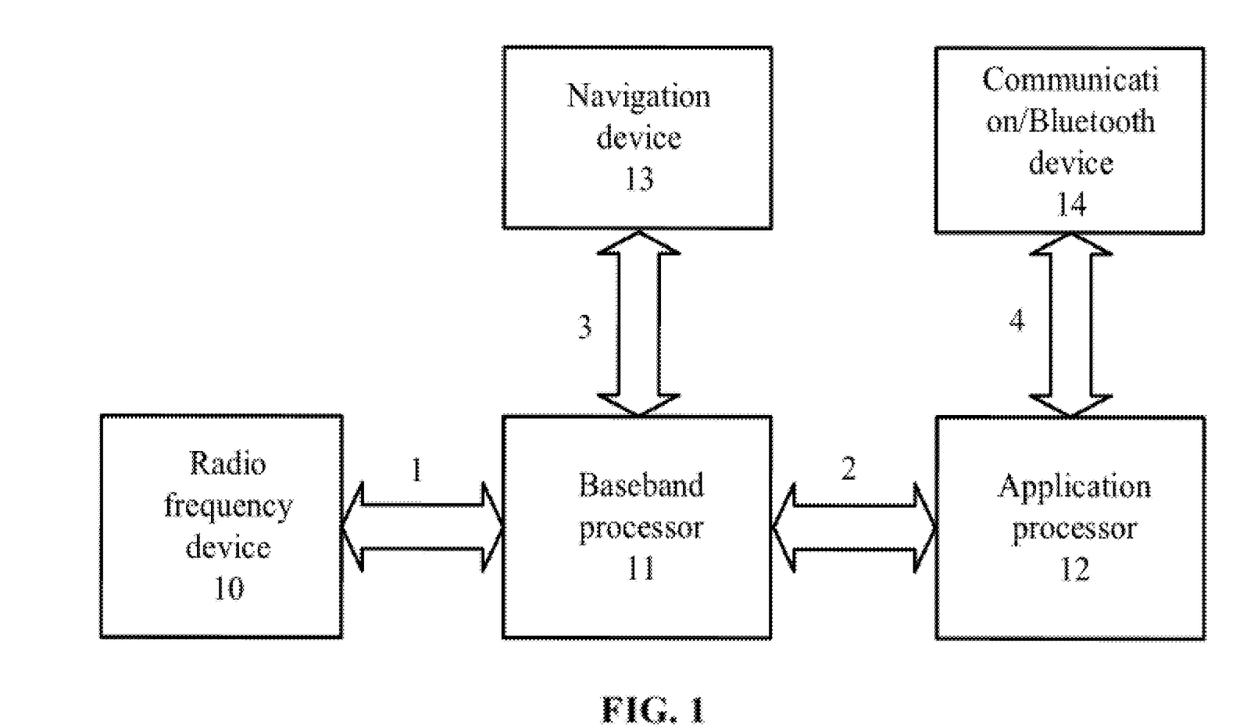
FIG. 1 shows a schematic diagram of a communication system module of a prior art.

FIG. 1 shows a schematic diagram of a communication system module of a prior art. As shown in FIG. 1, a connection interface 1 between a radio frequency device 10 and a baseband processor 11 comprises Radio Front End Baseband Digital Parallel (RBDP), standard/non-Standard high-speed interface, and etc. A connection interface 2 of the baseband processor 11 and the application processor 12 include Peripheral Component Interconnect Express (PCIe), universal serial bus (USB), safe digital input and output (SDIO), and etc. A connection interface 3 between the navigation device 13 and the baseband processor 11 comprises a second pulse interface, universal asynchronous receiver/transmitter (UART), wireless communication, and Bluetooth. A connection interface 4 between the communication/Bluetooth device 14 and the application processor 12 comprises PCIe, USB, and SDIO. Usually, data transmissions between the modules in the prior art communication system do not include reliability information such as safety attributes. A safety failure of a module may be acquired by additional communication between modules, however, the data transmitted may already be on an unreliable basis.

In a communication system specified in existing vehicles, the function safety settings in the communication chip design is mainly focused on internal safety monitoring and fault diagnosis alarms, for example: (1) A central processor may adapt a high-fault tolerance mechanism to trace back and correct errors; (2) When internal data transmission is performed, Error Correcting Code (ECC) or parity check may be implemented between nodes to alarm or report abnormalities to the central processor; (3) External interfaces, such as PCIe, Serial Rapid IO (SRIO), and etc., may use error retransmission mechanisms to improve the safety of data transmission, though, the reliability issues within the device cannot be fully covered.

There are many problems and risks in the above solution, such as: (1) in vehicle electronic systems, there are occasions where multi-processor communication and multi-chip communication are performed, wherein local safety problems in the system cannot be instantaneously dealt in time. (2) Data transmissions between different chips are not tagged (i.e., data tagged as safe data, or tagged as unsafe data); (3) Once a safety alarm is triggered, the processor in the main chip, may inform other collaborative chips by communication between the chip, though, abnormal data may be used as correct data by other chips. For example, in a two-chip interface communication, when the first chip passes the data through the USB to a second chip, a safety alarm is triggered. While the alarm information is transmitted to the central processor of the first chip to be identified and processed, the USB data has been transmitted to the second chip and is used by the second chip. When the first chip publishes the alarm information, the entire system is in a wrong place difficult to revert back to the time points before the error.

SUMMARY

The present application provides a secure communication device and method to solve the problems in the current communication system which unable to locate a safety break point in real time, tag relevant data signals in real-time, as well as instantaneously handle information generated by the safety failed unit.

In order to solve the above technical problems, this application is implemented in this regard:

In a first aspect, a method for diagnosing secure communication is proposed, comprising the following steps. Before performing a data transmission, a self-diagnosing mode is entered to check error checkpoints to generate a diagnostic status. The diagnostic status is collected to enter an error handling mode. It is determined whether an error exists in the diagnostic status. If there is an error, the error is shielded.

In a second aspect, a diagnosing device for secure communication is provided, comprising: a first diagnosis module, comprising a first function safety collection unit, and a first function safety sequence unit, configured in a first component provided in a device under test. A second diagnosis module, comprising a second function safety collection unit and a second function safety sequence unit, configured in a second component of the device under test. Wherein error checkpoints are deployed between the first component and the second component. Before the first component performs data transmission to the second component, the first diagnosis module enters a self-diagnosing mode to check the error checkpoints to generate diagnostic status. The first function safety collection unit collects the diagnostic status, and enters the error handling mode to determine whether an error exists in the diagnostic status. When the error exists, the error is shielded.

In the present application, through the method and device for diagnosing secure communication, the problem of safety error propagation between communication system modules due to safety malfunction is solved, so that the real-time data safety is greatly improved. Through reasonable safety failure checkpoint settings, the location of error points can be accurately confirmed, and the impact to the system safety can be quickly assessed.

It should be understood, however, that this summary may not contain all aspects and embodiments of the present invention, that this summary is not meant to be limiting or restrictive in any manner, and that the invention as disclosed herein will be understood by one of ordinary skill in the art to encompass obvious improvements and modifications thereto.

BRIEF DESCRIPTION OF THE DRAWINGS

The features of the exemplary embodiments believed to be novel and the components and/or the steps characteristic of the exemplary embodiments are set forth with particularity in the appended claims. The FIG.s are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present invention will now be described more fully hereinafter with reference to the accompanying drawings, in which exemplary embodiments of the invention are shown. This present invention may, however, be embodied in many different forms and should not be construed as limited to the embodiments set forth herein. Rather, these embodiments are provided so that this present invention will be thorough and complete, and will fully convey the scope of the present invention to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/comprising" and "comprise/comprising" are used in an open-ended fashion, and thus should be interpreted as "comprising but not limited to". "Substantial/substantially" means, within an acceptable error range, the person skilled in the art may solve the technical problem in a certain error range to achieve the basic technical effect.

The following description is of the best-contemplated mode of carrying out the invention. This description is made for the purpose of illustration of the general principles of the invention and should not be taken in a limiting sense. The scope of the invention is best determined by reference to the appended claims.

Moreover, the terms "include", "contain", and any variation thereof are intended to cover a non-exclusive inclusion. Therefore, a process, method, object, or device that comprises a series of components not only include these components, but also comprises other components not specified expressly, or may include inherent components of the process, method, object, or device. If no more limitations are made, a component limited by "include a/an . . . " does not exclude other same components existing in the process, the method, the article, or the device which comprises the component.

In the following embodiment, the same reference numerals are used to refer to the same or similar components throughout the invention.

The technical scheme in the embodiment of the application will be clearly and completely described below in combination with the accompanying drawings in the embodiment of the application. Obviously, the described embodiments are part of the embodiments of the application, not all of the embodiments. Based on the embodiments in the application, all other embodiments obtained by those skilled in the art without creative work belong to the scope of protection of the application.

Figure 2:
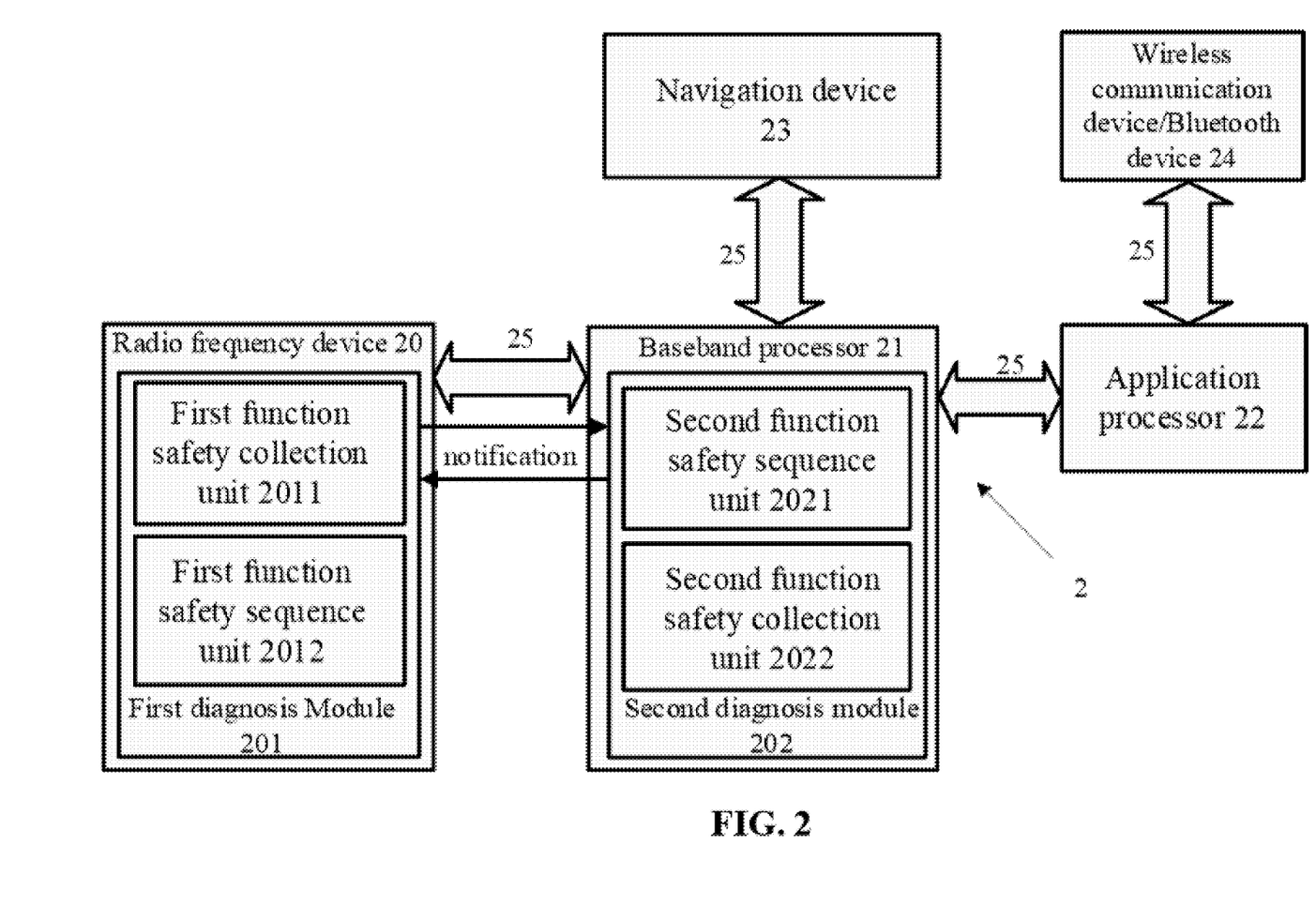
FIG. 2 shows is a block diagram of a diagnosing device according to an embodiment of the present application.

As shown in FIG. 2, the present application discloses a diagnosing system for secure communication, applicable to a communication system. The communication system 2 comprises a radio frequency device 20, a baseband processor 21, an application processor 22, a navigation device 23, and a wireless communication device/Bluetooth device 24. The diagnosing system of the secure communication comprises: a first diagnosis module 201 comprising a first function safety collection unit 2011 and a first function safety sequence unit 2012. The first diagnosis module 201 is arranged in the first component of the device under test (i.e., communication system 2) (i.e., RF device 20). The second diagnosis module 202 comprises a second function safety sequence unit 2021 and a second function safety collection unit 2022. The second diagnosis module 202 is arranged in the second component (i.e., baseband processor 21) of the device under test (i.e., communication system 2). An error checkpoint 25 is set between the first component (e.g., RF device 20) and the second component (e.g., baseband processor 21). Therefore, before the first component 20 transmits data to the second component 21, the first diagnosis module 201 enters a self-diagnosing mode to diagnosis error checkpoints to generate a diagnosis status. The first function safety collection unit 2012 collects the diagnosis status and enters the error handling mode to determine whether an error exists in the diagnosis status. If an error exists, the error is shielded. In addition, the first function safety sequence unit 2011 tags the error when the error is shielded. Furthermore, the first function safety sequence unit 2011 transmits a tag signal to tag the shielded error, wherein the first function safety sequence unit 2011 sets the tag signal to a high level to tag the shielded error, and the first function safety sequence unit 2011 tags the content of the data transmitted between the first component 20 and the second component 21, or, the first function safety sequence unit 2011 tags the contents of the data erroneously transmitted between the first component 20 and the second component 21.

In addition, when the first component 20 sends the request signal, the second component 21 receives the request signal, returns a response signal, and transmits data and shielded errors to the first component 20. The first function safety collection unit 2011 executes a command to be switched from the error handling mode to the self-diagnosing mode to recheck the error checkpoints 25.

In another embodiment of the application, before the second component (e.g., baseband processor 21) transmits data to the first component (RF device 20), the second diagnosis module 202 may enter the self-diagnosing mode to check the error checkpoints to generate a diagnosis status. The second function safety collection unit 2022 collects the diagnosis status and enters the error handling mode, to determine whether there is an error in the diagnosis status, and if there is an error, the error is shielded.

In addition, the second function safety sequence unit 2021 tags the shielded error when the error is shielded. Furthermore, when the second function safety sequence unit 2021 transmits a tag signal to tag the shielded error, the second function safety sequence unit 2021 sets the tag signal to a high level to tag the shielded error, and the second function safety sequence unit 2021 tags the content of the data transmitted between the second component 21 and the first component 20, or, the second function safety sequence unit 2021 tags the content of the data erroneously transmitted between the second component 21 and the first component 20.

In addition, when the second component 21 sends a request signal, the first component 20 receives the request signal, returns a response signal and transmits data and the shielded error to the second component 21. The second function safety collection unit 2022 executes a command to be switched from the error handling mode to the self-diagnosing mode to recheck the error checkpoints 25.

In addition to the above disclosure, the diagnosing system disclosed in the application is also provided with a plurality of diagnosis modules in a plurality of components for error shielding. The operation and handling of error shielding are the same as those of the above embodiment, so the detailed descriptions are not repeated herein.

Furthermore, when the baseband processor 21 and the RF device 20 perform data transmission and data exchanges, the diagnosis device may first enter the self-diagnosing mode to diagnosis one or more predetermined error checkpoints 25 to generate one or more diagnosis statuses. Thereafter, the first function safety collection unit 2011 of the first diagnosis module 201 in the RF device 20 collects the diagnosis statuses of a plurality of error checkpoints 25 and enters the error handling mode to determine whether there is an error in the diagnosis status generated by the error checkpoint 25. In other words, the first diagnosis module 201 in the RF device 20 may evaluate whether there is an error in the diagnosis status of the error checkpoint 25 between the baseband processor 21 and the RF device 20. If both the first function safety collection unit 2012 and the second function safety collection unit 2022 receive the diagnosis status generated by the error checkpoint 25 between the baseband processor 21 and the RF device 20, both indicating that an error has occurred. Thereafter, both the first function safety sequence unit 2011 and the second function safety sequence unit 2021 are informed that there is an error in the data to be transmitted. Before data transmission between the baseband processor 21 and the RF device 20, the first function safety sequence unit 2011 may shield the data and tag the data to be transmitted as erroneous data. If not, the first function safety sequence unit 2011 is notified that it is ready for data transmission. Similarly, the second function safety collection unit 2022 of the second diagnosis module 202 in the baseband processor 21 may also collect the diagnosis status of multiple error checkpoints 25 at the same time, and evaluate whether there is an error in the diagnosis status of the error checkpoints 25 between the baseband processor 21 and the RF device 20. If not, likewise, the second function safety sequence unit 2021 is informed that data transmission is ready. When the first function safety sequence unit 2011 and the second function safety sequence unit 2021 are ready for data transmission at the same time, data transmission will be carried out between the baseband processor 21 and the RF device 20.

In this example, the ways of tagging erroneous data in this application are: (1) out-of-band error tagging approach (2) In band error tagging approach.

Figure 3:
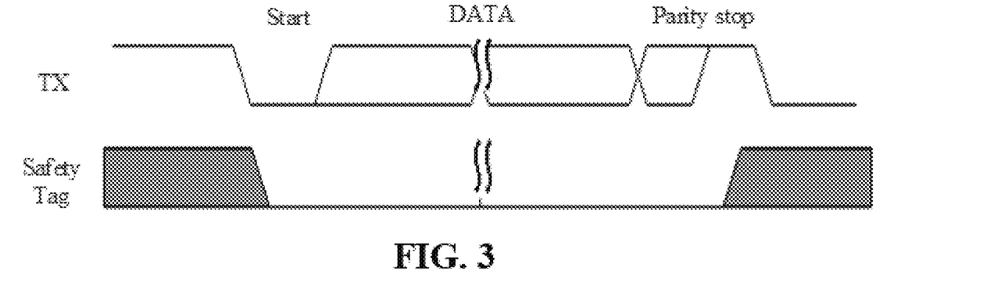
FIG. 3 shows a timing chart of a UART transmitting data without error statuses.
Figure 4:
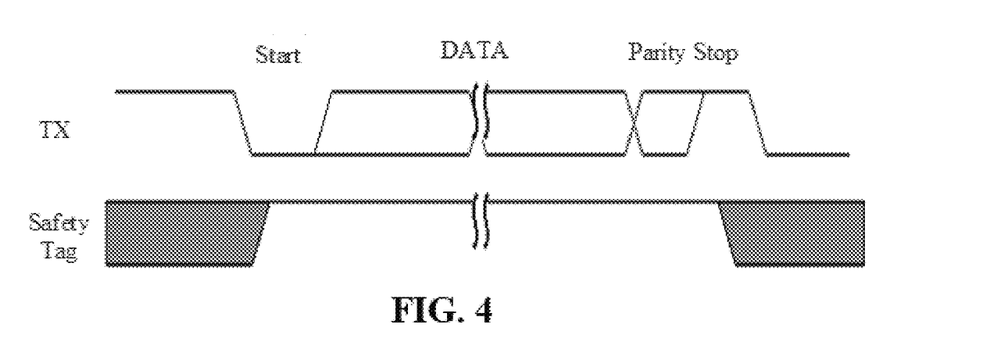
FIG. 4 shows a timing chart of the UART transmitting data with an error status.

The so-called out-of-band error tagging approach is adaptable for serial signals with simple interface protocol, with external tag signal considered. FIG. 3 shows a timing chart of a UART transmitting data without error statuses. As shown in FIG. 3, the UART protocol is taken as an example. Under the UART protocol, for the start status bit transmitted by the transmission (TX) end, the safety tag in the application can be set to a low level to indicate that there is no error in the data transmitted by UART, and the safety tag in the whole data signal transmission process remains low until the data transmission ends at a parity stop bit. FIG. 4 shows a timing chart of the UART transmitting data with an error status. As shown in FIG. 4, the UART protocol is taken as an example. In a start status bit transmitted by the transmission (TX) end under the UART protocol, the safety tag in the application can be set to a high level to indicate that the data transmitted by UART has error. The safety tag in the whole transmission process of data signal remains high until the data transmission ends at a parity stop bit.

Figure 5:
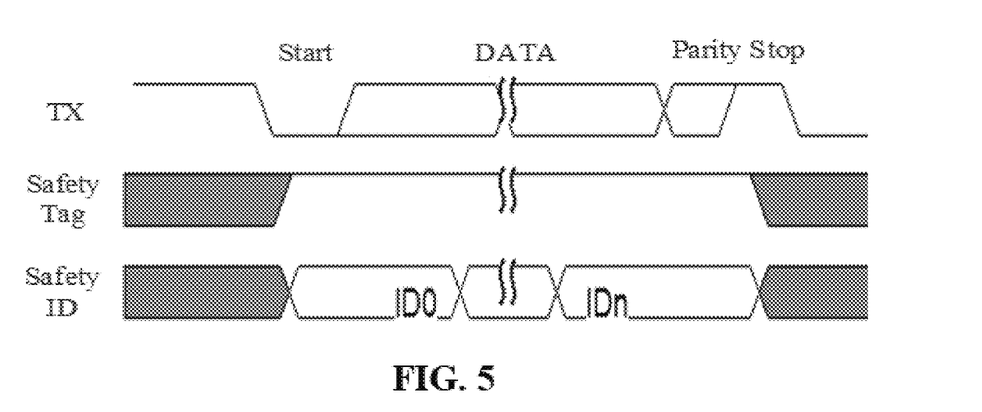
FIG. 5 shows a timing chart of the UART transmitting data with an error status and additional information in accordance with another embodiment of the present application.

FIG. 5 shows a data sequence diagram with error status and additional information transmitted for UART according to another embodiment of the present application. In this embodiment, if the information of specific error points is required to be transmitted, more out-of-band signals can be used. As shown in FIG. 5, in the corresponding data transmission process, the safety identification number (ID) of the error checkpoint can be attached, and the receiving end can carry out other optional operations according to the safety ID, such as ignoring the data or using the data conditionally. Specifically, according to the actual demand, the safety ID can distinguish abnormality or normality of the signal status by a high level, a low level or other multiple level combinations. For example, the high level indicates that the transmitted signal is normal, the low level indicates that the transmitted signal is abnormal, or conversely, the low level indicates that the signal is normal, and the high level indicates that the signal is abnormal.

Figure 6:
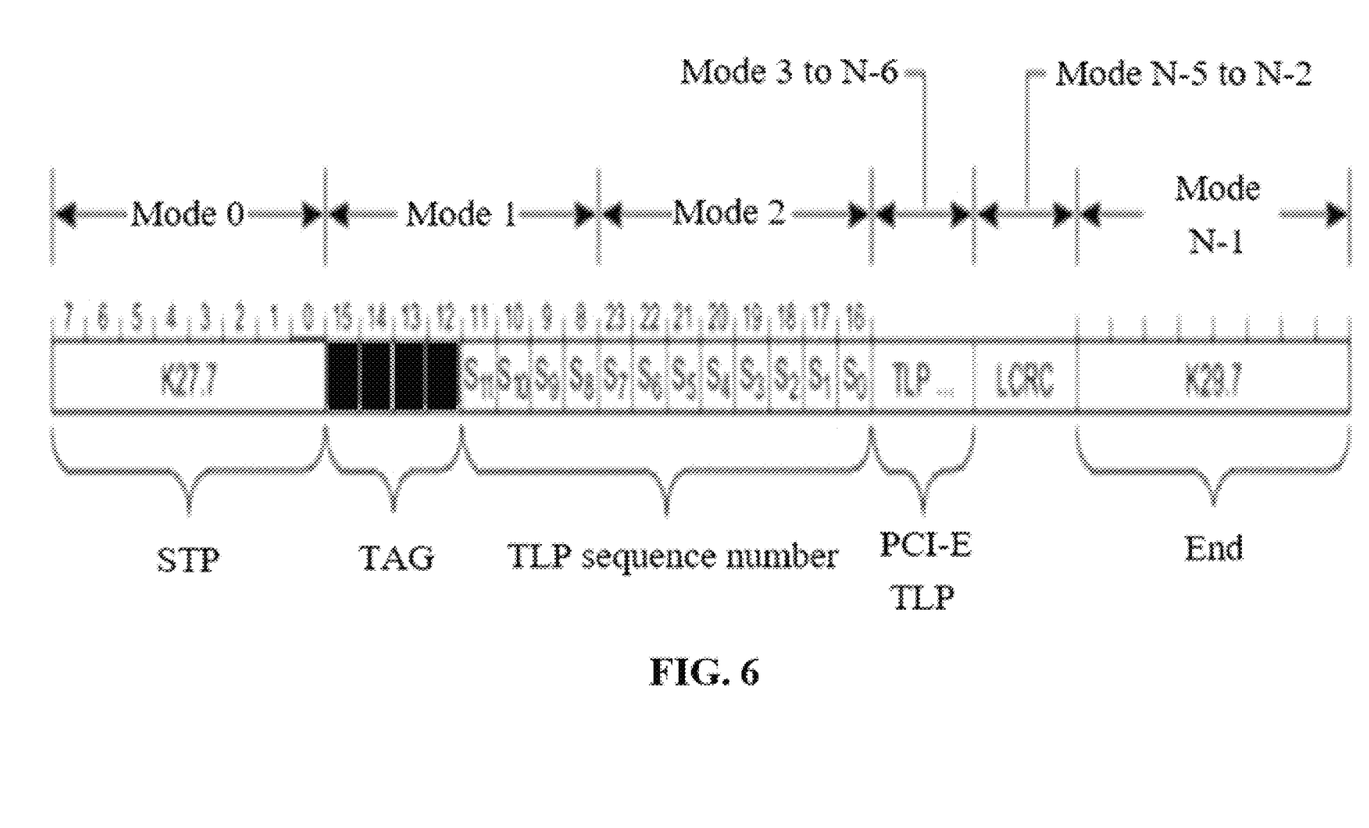
FIG. 6 shows a timing chart of a PCIe transmitting data with an error status.

The so-called in band error tagging method is applicable to the interface with complex transmission frame structure. If the frame structure has unused reserved bits or reserved data segments, or it can also allow the expansion of the frame structure, a method based thereon can be considered. In this way, a number of off chip pins can be reduced. FIG. 6 shows a timing chart of a PCIe transmitting data with an error status. As shown in FIG. 6, a transmission packet of PCIe is taken as an example. A reserved bit can be extended for error tagging. Of course, if the number of external pins is allowed to be increased for such interfaces, the out-of-band error tagging method can also be used.

Figure 7:
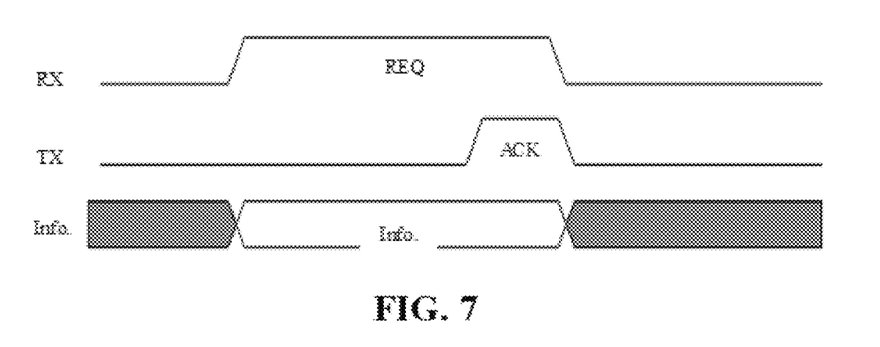
FIG. 7 shows an error tagging mechanism of a protocol handshake in accordance with still another embodiment of the present application.

In another embodiment of the application, considering the possibility that the system needs to reconfigure the error levels during operation, it is necessary to consider a mechanism to switch from the error tagging mode to the error handling mode. FIG. 7 shows an error tagging mechanism of a protocol handshake in accordance with still another embodiment of the present application. As shown in FIG. 7, the handshake request is generally initiated by the receiving end. The level is set high to indicate the handshake request (REQ). Meanwhile, additional signals can be added as information such as commands or error IDs to add more operation options. The transmitting end diagnoses the effective level of the request signal and sends a handshake response signal (ACK), indicating that the handshake request is received, and can make more operation choices according to the additional information. The receiving end checks the effective level of the response signal, and then sets the level of the request signal low, and thus the handshake interaction operation is concluded.

Figure 8:
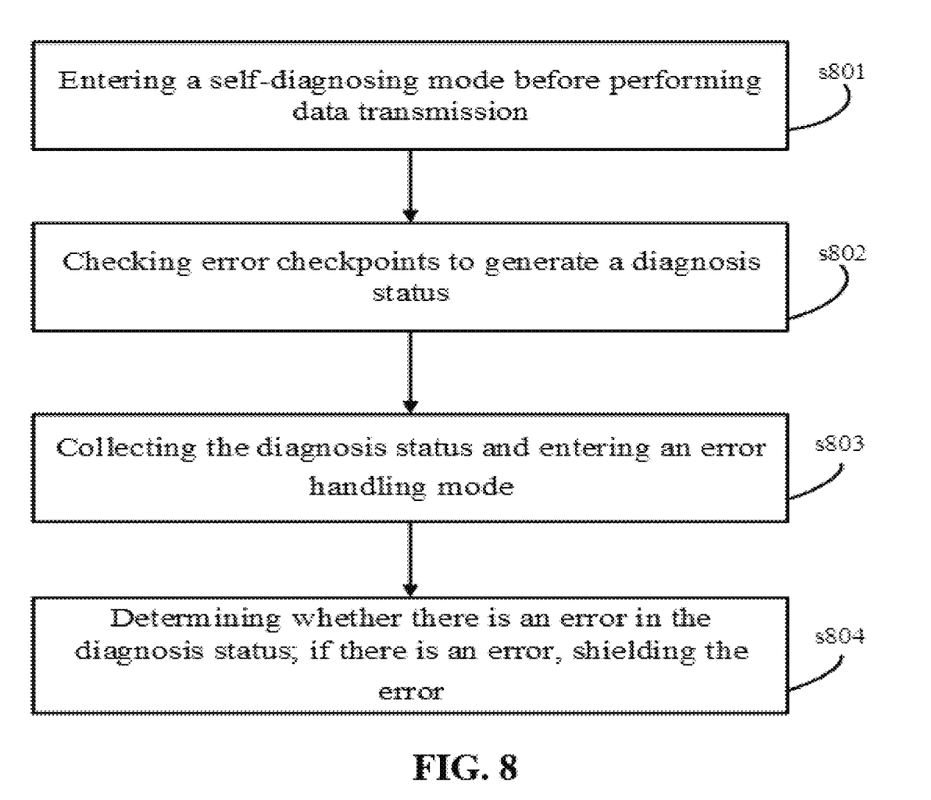
FIG. 8 is a flowchart showing the method for diagnosing secure communication.

The present application provides a method for diagnosing secure communication, and FIG. 8 is a flowchart showing the method for diagnosing secure communication. As shown in FIG. 8, the present application discloses a method for diagnosing secure communication, which can be applied to a communication system. The method for diagnosing secure communication comprises entering a self-diagnosing mode before performing a data transmission (step s801); Checking an error checkpoint to generate a diagnosis status (step S802); Collecting the diagnosis status and enter an error handling mode (step s803); Determining whether there is an error in the diagnosis status, and if there is an error, shielding the error (step s804).

In addition, in the present embodiment, the method for diagnosing secure communication also comprises tagging the shielded error. In addition, the diagnosis method of the present application sends a tag signal to tag the shielded error, wherein the tag signal is set to a high level to tag the shielded error, or to tag the content of the transmitted data. The diagnosis method of the application can also send a request signal. When the request signal is received, it returns the response signal and transmits the data and the shielded error. The diagnosis method of the application executes a command in the error handling mode to return from the error handling mode to the self-diagnosing mode to recheck the error checkpoint.

It should be noted that in this paper, the terms "include", "include" or any other variation thereof are intended to cover non-exclusive inclusion, so that a process, method, article or device including a series of components comprises not only those components, but also other components not explicitly listed, or for such process, method, and component inherent in an article or device. Without further restrictions, the component defined by the statement "including a . . . " does not exclude the existence of another same component in the process, method, article or device including the component.

The embodiments of the application are described above in combination with the accompanying drawings, but the application is not limited to the above specific embodiments. The above specific embodiments are only schematic rather than restrictive. Those skilled in the art can make many forms under the Enlightenment of the application and without departing from the scope protected by the object and claims of the application, all belong to the protection of this application.

It is to be understood that the term "comprises", "comprising", or any other variants thereof, is intended to encompass a non-exclusive inclusion, such that a process, method, article, or device of a series of components not only include those components but also comprises other components that are not explicitly listed, or components that are inherent to such a process, method, article, or device. A component defined by the phrase "comprising a . . . " does not exclude the presence of the same component in the process, method, article, or device that comprises the component.

Although the present invention has been explained in relation to its preferred embodiment, it does not intend to limit the present invention. It will be apparent to those skilled in the art having regard to this present invention that other modifications of the exemplary embodiments beyond those embodiments specifically described here may be made without departing from the spirit of the invention. Accordingly, such modifications are considered within the scope of the invention as limited solely by the appended claims.

What is claimed is:

1. A method for diagnosing secure communication, comprising:
    entering a self-diagnosing mode before performing data transmission;
    checking error checkpoints to generate a diagnostic status;
    collecting the diagnostic status and entering an error handling mode;
    determining when an error exists in the diagnostic status, when the error exists, shielding the error; and
    tagging the error being shielded, which comprising transmitting a tag signal to tag the error being shielded, wherein the tag signal is set to a high level for tagging the error being shielded, or erroneously transmitted contents of the data transmission.

2. The method for diagnosing secure communication as claimed in claim 1, further comprising transmitting a request signal, and when the request signal is received, transmitting a response signal, and performing the data transmission with the error being shielded.

3. The method for diagnosing secure communication as claimed in claim 1, further comprising: when in the error handling mode, executing a command to switch to the self-diagnosing mode to recheck the error checkpoints.

4. A secure communication diagnosing device, comprising:
    a first diagnosis module comprising a first function safety collection unit and a first function safety sequence unit, configured in a first component of a device under test;
    a second diagnosis module comprising a second function safety collection unit and a second function safety sequence unit, configured in a second component of the device under test; wherein
    error checkpoints are deployed between the first component and the second component;
    before the first component performing data transmission to the second component, the first diagnosis module enters a self-diagnosing mode to check the error checkpoints to generate diagnostic status;
    the first function safety collection unit collects the diagnostic status, and enters the error handling mode to determine whether an error exists in the diagnostic status; and
    when the error exists, the error is shielded;
    wherein the first function safety sequence unit tags the error when the error is shielded;
    wherein the first function safety sequence unit transmits a tag signal to tag the error being shielded; and the first function safety sequence unit sets the tag signal to a high level to tag the error and to tag data transmitted between the first component and the second component, or to tag data erroneously transmitted between the first component and the second component.

5. The secure communication device as claimed in claim 4, wherein when the second component receives a request signal, the second component returns a response signal, and performs the data transmission with the error being shielded to the first component.

6. The secure communication device as claimed in claim 4, wherein when the first function safety collection unit is in the error handling mode, the first function safety collection unit executes a command to switch from the error handling mode to the self-diagnosing mode, to recheck the error checkpoints.

7. A method for diagnosing secure communication, comprising:
    entering a self-diagnosing mode before performing data transmission;

checking error checkpoints to generate a diagnostic status;

collecting the diagnostic status and entering an error handling mode;

determining when an error exists in the diagnostic status, when the error exists, shielding the error;

tagging the error being shielded; and transmitting a request signal, and when the request signal is received, transmitting a response signal, and performing the data transmission with the error being shielded.

8. The method for diagnosing secure communication as claimed in claim 7, further comprising: when in the error handling mode, executing a command to switch to the self-diagnosing mode to recheck the error checkpoints.

* * * * *